US006615139B1

(12) United States Patent
Chakravarthi

(10) Patent No.: US 6,615,139 B1
(45) Date of Patent: Sep. 2, 2003

(54) DIGITALLY IMPLEMENTED METHOD FOR AUTOMATIC OPTIMIZATION OF GRAVITY FIELDS OBTAINED FROM THREE-DIMENSIONAL DENSITY INTERFACES USING DEPTH DEPENDENT DENSITY

(75) Inventor: Vishnubhotla Chakravarthi, Hyderabad (IN)

(73) Assignee: Council of Scientific & Industrial Research, New Delhi (IN)

(*) Notice: Subject to any disclaimer, the term of this patent is extended or adjusted under 35 U.S.C. 154(b) by 0 days.

(21) Appl. No.: 10/109,615

(22) Filed: Mar. 28, 2002

(51) Int. Cl.[7] .................................................. G01V 7/00
(52) U.S. Cl. ................... 702/2; 702/5; 702/14
(58) Field of Search ..................... 702/2, 5, 14; 367/73

(56) References Cited

U.S. PATENT DOCUMENTS 5,012,675 A * 5/1991 Koller et al. .............. 73/432.1
5,282,132 A * 1/1994 Trout ............................ 702/5
6,502,037 B1 * 12/2002 Jorgensen et al. ........... 702/14

* cited by examiner

*Primary Examiner*—Edward Lefkowitz
*Assistant Examiner*—Anthony Gutierrez
(74) *Attorney, Agent, or Firm*—Sughrue Mion, PLLC

(57) ABSTRACT

The present invention relates to a digitally implemented method for determining basement depths of 3-dimensional density interfaces from gridded gravity data, wherein density contrast above the interface is assumed to be varying parabolically with depth, the present invention method assumes a continuous decrease in density contrast of sedimentary rocks with depth, a phenomena well observed all over the world.

45 Claims, 6 Drawing Sheets

DIGITALLY IMPLEMENTED METHOD FOR AUTOMATIC OPTIMIZATION OF GRAVITY FIELDS OBTAINED FROM THREE-DIMENSIONAL DENSITY INTERFACES USING DEPTH DEPENDENT DENSITY

FIELD OF INVENTION

The present invention relates to a digitally implemented method for determining basement depths of 3-dimensional density interfaces from gridded gravity data. The density contrast above the interface is assumed to be varying parabolically with depth.

BACKGROUND AND PRIOR ART REFERENCES

It has been known since the time of Sir Isaac Newton that bodies having mass would exert a force on each other. Therefore, from measurements of gravity fields, it could be possible to identify large objects having a change in density even the objects are buried beneath the earth's surface. When objectives are meant for regional geological and hydrocarbon explorations, lateral variation in density between the sedimentary and basement rock mass is generally responsible for the measured gravity fields. In one article, The use of rapid digital computing methods for direct gravity interpretation of sedimentary basins, Geophysical Journal of the Royal Astronomical Society, Vol. 3, 1960, Bott has suggested a simple but ingenious method to trace the floor of a sedimentary basin from the measured gravity fields. This method of interpretation involved the approximation of a sedimentary basin by a series of two-dimensional juxtaposed blocks having uniform density. However, in nature, many sedimentary basins on the continental platform have limited strike lengths, and therefore, approximation of such basins by geophysical geometries having limited strike lengths are often justified. Further, copious of evidence exists to show that the density of sedimentary rocks increases with depth.

In two articles, The development and use of a high precession down hole gravity meter, Geophysics, Vol. 31, No. 4, 1966 by Howell et al and, Variation of density with rock type, depth, and formation in the Western Canada basin from density logs, Geophysics, Vol. 45, No. 6, 1980 by Maxant, it was shown that the density of sedimentary rocks varies with depth. In two more articles, Three-dimensional interpretation of gravity data from sedimentary basins using an exponential density-depth function, Geophysical Prospecting, Vol. 35, No. 9, 1987 by Granser and, Gravity inversion of an interface above which the density contrast varies exponentially with depth, Geophysics, Vol. 53, No.6, 1988 by Chai et al, it was shown that the decrease in density contrast of sedimentary rocks with depth could be simulated by an exponential density-depth function. In a recent article, INVER2DBASE-A program to compute basement depths of density interfaces above which the density contrast varies with depth, Computers & Geosciences, Vol. 27, No. 10, 2001, Chakravarthi et al opined that at least it is not possible in the space domain to derive analytical gravity expressions of geophysical geometries with an exponential density-depth function. Further, it was shown that in spite of the existence of theoretical gravity solutions in the frequency domain with an exponential density-depth function, truncation errors would cause serious problems while transforming theoretical gravity fields from frequency to space domain. In the same article it was further shown that the parabolic density-depth function could be one of the alternatives to simulate the decrease in density contrast of sedimentary rocks with depth and such a simulation could make it possible to derive closed form analytical gravity expressions in the space domain. In the present invention, the parabolic density function is used to develop a method of interpretation and related computer code to optimize the gravity fields of three-dimensional subterranean density interfaces.

REFERENCES

Bott, M.H.P., 1960, The use of rapid digital computing methods for direct gravity interpretation of sedimentary basins, Geophysical Journal of the Royal Astronomical Society, Vol. 3, P 63–67.

Howell, L. G., Heintz, K. O., Barry, A. 1966, The development and use of a high precession down hole gravity meter, Geophysics, Vol. 31, No. 4, P 764–772. Maxant,J. 1980, Variation of density with rock type, depth, and formation in the Western Canada basin from density logs, Geophysics, Vol. 45, No. 6, P 1061–1076.

Granser, H. 1987, Three-dimensional interpretation of gravity data from sedimentary basins using an exponential density-depth function, Geophysical prospecting, Vol. 35, No. 9, P 1030–1041.

Chai, Y. J., Hinze, W. J., 1988, Gravity inversion of an interface above which the density contrast varies exponentially with depth, Geophysics, Vol. 53, No. 6, P 837–845.

Chakravarthi, V, 1995, Gravity interpretation of non-outcropping sedimentary basins among which the density contrast decreases parabolically with depth, Pure & Applied Geophysics, Vol. 145, No. 2, P. 327–335.

Chakravarthi, V., Singh, S. B., Ashok babu, G., 2001, INVER2DBASE—A program to compute basement depths of density interfaces above which the density contrast varies with depth, Computers & Geosciences, Vol. 27, No. 10, P. 1127–1133.

OBJECTS OF THE INVENTION

The primary object is to accurately simulate the density contrast depth dependence of sedimentary sequence in a sedimentary basin and henceforth to establish a comprehensive formulation for future activities.

Another object is to obtain accurate depth estimates to the floor of a sedimentary basin from the measured gravity fields.

BRIEF DESCRIPTION OF DRAWLNGS

DETAILED DESCRIPTION OF THE INVENTION

Figure 1:
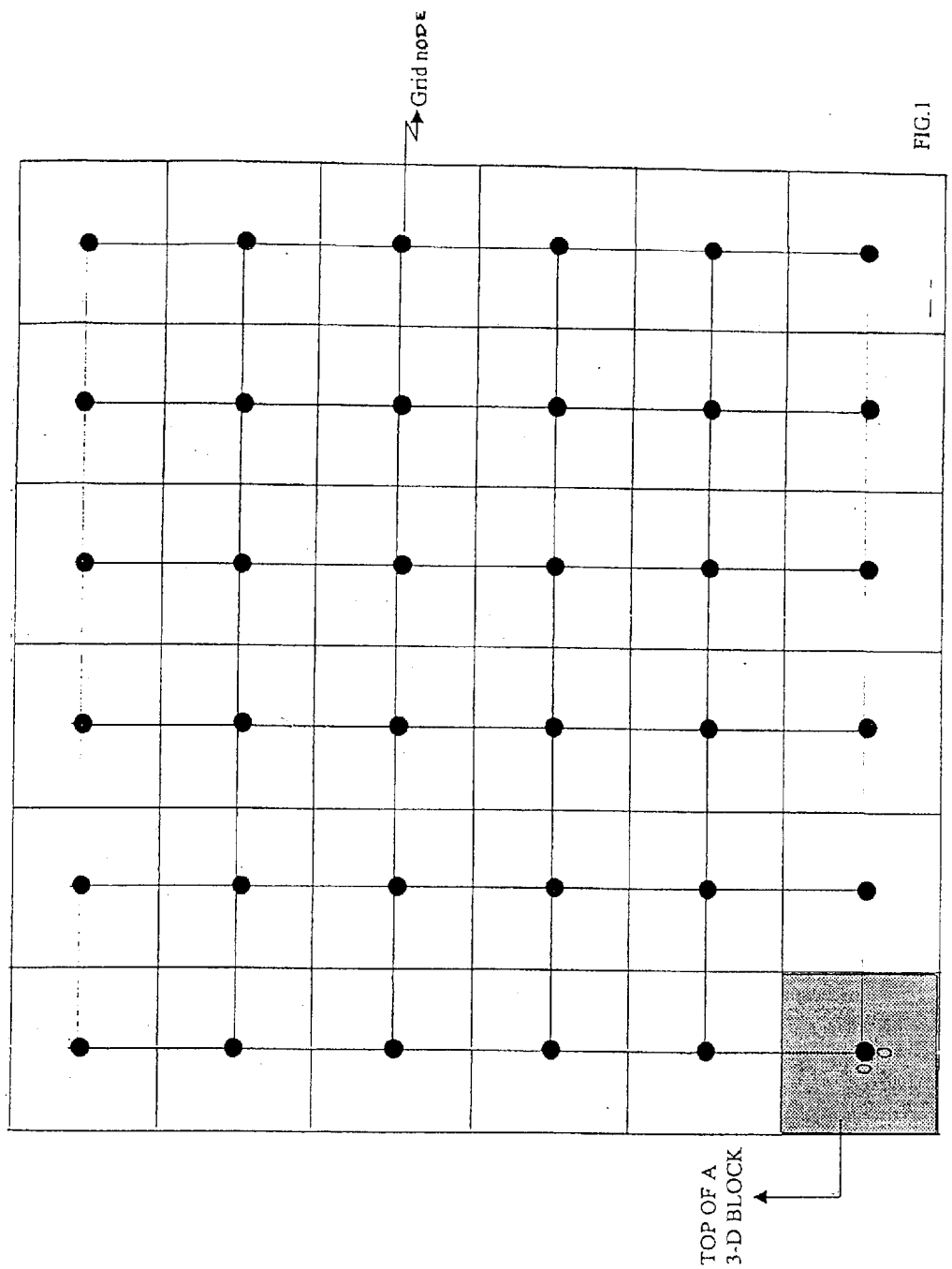
FIG. 1 is a schematic diagram showing a rectangular/square mesh. The geometry of a 3-dimensional rectangular/square block with respect to a grid node is also shown.

Accordingly, the present invention provides a digitally implemented method for determining depth values of a subterranean 3-dimensional density interface based on which a parabolic density-depth function models the decrease in density contrast of sedimentary rocks with depth, said method comprising the steps of:

(a) measuring gravity field values at plurality of locations over a region covering a sedimentary basin, and said plurality of locations coincide with plurality of grid nodes of a said rectangular/square mesh;

(b) approximating the sedimentary sequence above a density interface by an array of 3-dimensional rectangular/square blocks with their epicenters coincide with said grid nodes of a said mesh;

(c) calculating initial depth estimates of a density interface for the said array of 3-dimensional blocks at said plurality of grid nodes;

(d) calculating predicted gravity fields of said 3-dimensional rectangular/square blocks at said plurality of grid nodes of a said mesh;

(e) calculating misfit function between said measured and predicted gravity fields;

(f) improving depth extents of said 3-dimensional rectangular/square blocks at said plurality of grid nodes;

(g) repeating steps (d)–(f), iteratively, until said number of iterations are complete or said misfit function falls below a said predefined error; and (h) importing said generated grid files to GOLDEN SOFTWARE SURFER PACKAGE for viewing said interpreted results in the form of respective contour maps.

An embodiment of the present invention, wherein the said rectangular mesh having dimensions to cover the subterranean surface.

Another embodiment of the present invention, wherein the density contrast among said 3-dimensional blocks is assumed to be varying parabolically with depth.

Yet another embodiment of the present invention, wherein the grid node is the intersection point of two profiles constructed along X and Y axes.

Still another embodiment of the present invention, wherein the density contrast is the difference in densities of sedimentary sequence and basement complex.

Yet another embodiment of the present invention, wherein the density interface is the boundary between sedimentary sequence and basement complex.

Still another embodiment of the present invention, wherein the misfit function is defined as the sum of the squares of the differences between the measured and predicted gravity fields.

Further embodiment of the present invention, wherein the residual gravity field is the gravity contribution generated by the sedimentary sequence alone.

Yet another embodiment of the present invention, wherein the regional gravity field is the gravity contribution generated by the deeper sources.

Still another embodiment of the present invention, wherein the parabolic density-depth function is simulated to ascribe the decrease in density contrast of sedimentary sequence with depth.

Yet another embodiment of the present invention, wherein the corrections applied to raw data are selected from normal or latitude correction, topographic correction, Bouguer correction free-air correction and isostatic correction.

Still another embodiment of the present invention, wherein said method reduces Bouguer gravity fields to a horizontal plane.

Yet another embodiment of the present invention, wherein Bouguer gravity field is the gravity contribution generated by shallow, intermediate and deeper sources.

Still another embodiment of the present invention, wherein said method extracts residual gravity fields from Bouguer gravity fields.

Yet another embodiment of the present invention, wherein the regional gravity field is determined by equating gravity contributions of out cropping density interface to be equivalent to zero milligals.

Still another embodiment of the present invention, wherein calculating constants of said parabolic density-depth function by selecting at least one from a known subterranean geological information, subterranean well log data, prestack inversion of seismic data, post stack inversion of seismic data and seismic tomography.

Yet another embodiment of the present invention, wherein initializing the geometry of a density interface is done presuming that the existence of infinite slabs at the grid nodes of the mesh generates the measured gravity fields where the density contrast decreases parabolically with depth.

Further embodiment of the present invention, wherein equating the width and strike length of a said 3-dimensional rectangular/square block to the grid node spacing in X and Y directions of a said mesh.

Yet another embodiment of the present invention, wherein calculating cumulative predicted gravity fields of said 3-dimensional rectangular/square blocks at said grid nodes of a said mesh.

Further embodiment of the present invention, wherein deriving an analytical gravity expression of a 3-dimensional rectangular/square block in which a parabolic density-depth function models the decrease in density contrast with depth.

Yet another embodiment of the present invention, wherein calculating errors and misfit function between the measured and predicted gravity fields of said 3-dimensional rectangular/square blocks.

Further embodiment of the present invention, wherein calculating numerical derivatives of said 3-dimensional rectangular/square blocks at said grid nodes of said mesh.

Yet another embodiment of the present invention, wherein linear and normal equations are constructed.

Further embodiment of the present invention, wherein solving said normal equations for said increments in depth extents of said rectangular/square blocks at said grid nodes.

Still another embodiment of the present invention, wherein the depths of 3-dimensional rectangular/square blocks are not allowed to extend beyond a said permissible depth.

Yet another method of the present invention, wherein by repeating steps (d)–(f), iteratively, the updating of depth extents of 3-dimensional rectangular/square blocks at said grid nodes of said mesh is performed.

Still another embodiment of the present invention, wherein performing continuing processes (8)–(15), until said misfit function falls below a said predefined error or said number of iterations completed.

Yet another embodiment of the present invention, wherein creating four grid files, one each for the measured gravity, predicted gravity, plan view of basement relief and 3-d view of basement relief models.

Still another embodiment of the present invention, wherein said method generates said grid files either when the misfit function falls below a predefined allowable error or the specified number of iterations completed.

Another embodiment of the present invention, wherein the maximum depth to the basement interface obtained is about 3–9 km.

Further embodiment of the present invention, wherein said digitally implemented method having means to invert the gravity fields to provide depth values to 3-dimensional density interfaces.

Yet another embodiment of the present invention, wherein said digitally implemented method having means to input data files.

Still another embodiment of the present invention, wherein said digitally implemented method invoking the user to specify six file names, two for the input and output files and four for the corresponding grid files.

Yet another embodiment of the present invention, wherein said digitally implemented method having the input data file consisting of five data cards.

Further embodiment of the present invention, wherein said digitally implemented method having the first data card consisting of the number of grid nodes in X and Y directions specified in an integer format.

Yet another embodiment of the present invention, wherein said digitally implemented method having the second data card consisting of the grid node interval in X and Y directions specified in real format.

Still another embodiment of the present invention, wherein said digitally implemented method having the third data card consisting of the observed surface density contrast and constant of the parabolic density-depth function specified in real format.

Further embodiment of the present invention, wherein said digitally implemented method having the fourth card with number of iterations to be performed.

Yet another embodiment of the present invention, wherein said digitally implemented method having the fifth data card consisting of the measured residual gravity fields in a real format.

Further embodiment of the present invention, wherein said digitally implemented method having output file as means to provide the data relating to measured and predicted gravity fields, and depths to the interface.

Yet another embodiment of the present invention, wherein said digitally implemented method having means to input parameters to generate one text file and four grid files as an output.

Still another embodiment of the present invention, wherein said digitally implemented method, wherein the text file provides ASCII data for the measured and predicted gravity fields and depths to the interface.

Yet another embodiment of the present invention, wherein the Grid files are generated automatically by said method and having compatibility to import Grid files into the GOLDEN SOFTWARE SURFER PACKAGE to view the results in the form of contour maps.

Still another embodiment of the present invention, wherein said method assumes a continuous decrease in density contrast of sedimentary rocks with depth.

Yet another embodiment of the present invention, wherein the said method is implemented on systems based WINDOWS or UNIX based operating systems.

The present invention describes the development of an inversion process to optimize the gravity fields to provide depth values of 3-dimensional density interfaces above, which a parabolic density-depth function models the decrease in density contrast of sedimentary rocks with depth.

The parabolic density function is defined as, $$\Delta\rho(z) = \frac{\Delta\rho_0^3}{(\Delta\rho_0 - \alpha z)^2} \tag{1}$$

where $\Delta\rho(z)$ is the density contrast at any depth z, $\Delta\rho 0$ is the density contrast measured at the ground surface and a is a constant expressed in gm/cc/Km.

The gravity fields are measured at a plurality of grid nodes on a rectangular/square mesh covering a subterranean density interface (FIG. 1). An ensemble of 3-dimensional rectangular/square blocks put in juxtaposition approximates the sedimentary sequence above a density interface (FIG. 1). Method to compute the theoretical gravity field of a 3-dimensional rectangular/square block further requires an analytical gravity expression.

Expression for the Gravity Anomaly

Figure 2:
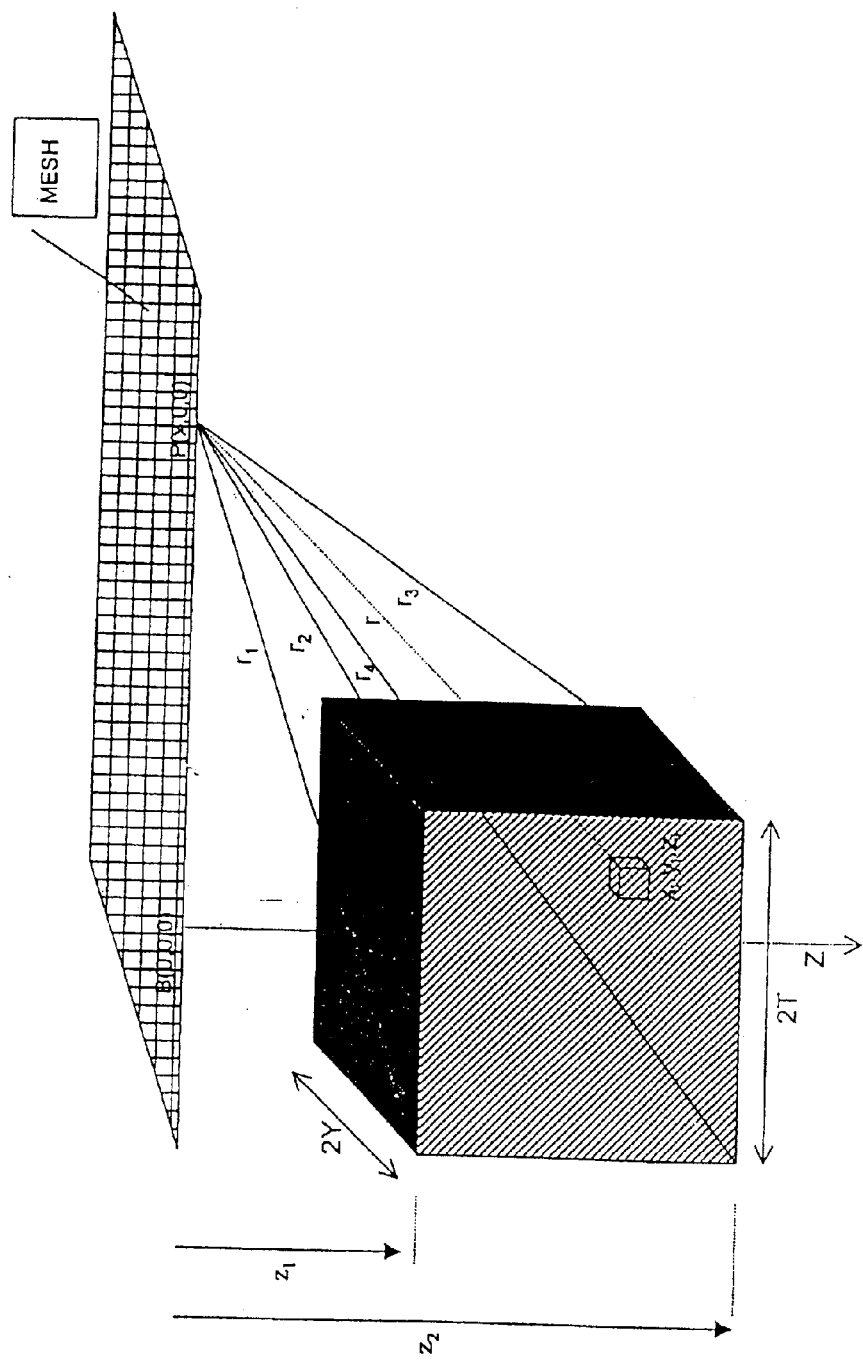
FIG. 2 shows the geometrical orientation of a 3-dimensional rectangular/square block in Cartesian coordinate system.

Let 2T (width of the block), 2Y (strike length of the block), Z1 (depth to the top of the block), Z2 (depth to the bottom of the block) are the dimensions of a 3-dimensional rectangular/square block as shown in FIG. 2. Let the density contrast along the block decreases vertically according to #EQU1#. Placing the origin of the Cartesian coordinate system B (0,0,0) vertically above the centre of the block, the gravity anomaly at any point P (x, 0,0) on the XY plane (mesh) could be obtained by integrating the gravity effect of a 3-dimensional element volume x1.y1.z1 through out the volume of the block and can be expressed as, $$g_{PRISM}(x,0,0) = G\Delta\rho(z)\int_{z_1}^{z_2}\int_{-T}^{T}\int_{-Y}^{Y}\frac{z_l\,dx_l\,dy_l\,dz_l}{[(x-x_l)^2+y_l^2+z_l^2]^{3/2}} \tag{2}$$

Substituting #EQU# (1) for $\Delta\rho$ (z) in #EQU# (2), $$g_{PRISM}(x,0,0) = G\Delta\rho_0^3\int_{z_1}^{z_2}\int_{-T}^{T}\int_{-Y}^{Y}\frac{1}{(\Delta\rho_0-\alpha z_l)^2}\frac{z_l\,dx_l\,dy_l\,dz_l}{[(x-x_l)^2+y_l^2+z_l^2]^{3/2}}$$

$$= 2G\Delta\rho_0^3 Y\int_{z_1}^{z_2}\int_{x-T}^{x+T}\frac{1}{(\Delta\rho_0-\alpha z_l)^2}\frac{z_l\,dx_l\,dz_l}{[x_l^2+Y^2+z_l^2]^{1/2}(x_l^2+z_l^2)}$$

Integrating above equation with respect to x between limits x-T and x+T, $$g_{PRISM}(x,0,0) = 2G\Delta\rho_0^3\int_{z_1}^{z_2}\frac{1}{(\Delta\rho_0-\alpha z_l)^2}\left[\tan^{-1}\frac{Y(x+T)}{z_l\sqrt{(x+T)^2+Y^2+z_l^2}} - \right.$$

$$\left.\tan^{-1}\frac{Y(x-T)}{z_l\sqrt{(x-T)^2+Y^2+z_l^2}}\right]dz$$

After integration, $$g_{PRISM}(x,0,0) = 2G\Delta\rho_0^3 \left\{ \frac{\alpha Y(x+T)(2\Delta\rho_0^2 + \alpha^2|Y^2 + (x+T)^2|)}{L_1(Y^2\alpha^2 + \Delta\rho_0^2)(\Delta\rho_0^2 + \alpha^2|x+T|^2)} \ln\frac{L_3(\alpha r_4 L_1 + L_1^2 - \Delta\rho_0 L_4)}{L_4(\alpha r_1 L_1 + L_1^2 - \Delta\rho_0 L_3)} - \right. \quad (3)$$

$$\frac{\alpha Y(x-T)(2\Delta\rho_0^2 + \alpha^2|Y^2 + (x-T)^2|)}{L_2(Y^2\alpha^2 + \Delta\rho_0^2)(\Delta\rho_0^2 + \alpha^2|x-T|^2)} \ln\frac{L_3(\alpha r_3 L_2 + L_2^2 - \Delta\rho_0 L_4)}{L_4(\alpha r_2 L_2 + L_2^2 - \Delta\rho_0 L_3)} -$$

$$\frac{\Delta\rho_0}{\alpha(\Delta\rho_0^2 + Y^2\alpha^2)}\left[\tan^{-1}\frac{Yr_4}{z_2|x+T|} - \tan^{-1}\frac{Yr_1}{z_1|x+T|}\right] +$$

$$\frac{\Delta\rho_0}{\alpha(\Delta\rho_0^2 + Y^2\alpha^2)}\left[\tan^{-1}\frac{Yr_3}{z_2|x-T|} - \tan^{-1}\frac{Yr_2}{z_1|x-T|}\right] -$$

$$\frac{\Delta\rho_0}{\alpha(\Delta\rho_0^2 + |x-T|^2\alpha^2)}\left[\tan^{-1}\frac{|x-T|r_3}{z_2 Y} - \tan^{-1}\frac{|x-T|r_2}{z_1 Y}\right] +$$

$$\frac{Y}{2(\Delta\rho_0^2 + Y^2\alpha^2)}\ln\left[\frac{(|x+T|-r_4)(|x+T|+r_1)}{(|x+T|+r_4)(|x+T|-r_1)}\right] -$$

$$\frac{\Delta\rho_0}{\alpha(\Delta\rho_0^2 + |x+T|^2\alpha^2)}\left[\tan^{-1}\frac{|x+T|r_4}{z_2 Y} - \tan^{-1}\frac{|x+T|r_1}{z_1 Y}\right] +$$

$$\frac{Y}{2(\Delta\rho_0^2 + Y^2\alpha^2)}\ln\left[\frac{(|x-T|-r_3)(|x-T|+r_2)}{(|x-T|+r_3)(|x-T|-r_2)}\right] +$$

$$\frac{1}{\alpha}\left[\frac{1}{\Delta\rho_0 - \alpha z_2}\left\langle\tan^{-1}\frac{Y|x+T|}{z_2 r_4} - \tan^{-1}\frac{Y|x-T|}{z_2 r_3}\right\rangle\right] +$$

$$\frac{x+T}{2(\Delta\rho_0^2 + |x+T|^2\alpha^2)}\ln\left[\frac{(Y-r_4)(Y+r_1)}{(Y+r_4)(Y-r_1)}\right] +$$

$$\frac{x-T}{2(\Delta\rho_0^2 + |x-T|^2\alpha^2)}\ln\left[\frac{(Y-r_3)(Y+r_2)}{(Y+r_3)(Y-r_2)}\right] -$$

$$\left.\frac{1}{\alpha}\left[\frac{1}{\Delta\rho_0 - \alpha z_1}\left\langle\tan^{-1}\frac{Y|x+T|}{z_1 r_1} - \tan^{-1}\frac{Y|x-T|}{z_1 r_2}\right\rangle\right]\right\}$$

Here, $L1 = \{[(x+T)2+Y2]\alpha 2 + \Delta\rho 02\}^{\frac{1}{2}}$ $L2 = \{[(x-T)2+Y2]\alpha 2 + \Delta\rho 02\}^{\frac{1}{2}}$ $L3 = \Delta\rho 0 - \alpha z1$ $L4 = \Delta\rho 0 - \alpha z2$ and $r1 = [(x+T)2+Y2+z12]^{\frac{1}{2}}$ $r2 = [(x-T)2+Y2+z12]^{\frac{1}{2}}$ $r3 = [(x-T)2+Y2+z22]^{\frac{1}{2}}$ $r4 = [(x+T)2+Y2+z22]^{\frac{1}{2}}$ are explained in FIG. 2. Here G is the Universal Gravitational Constant. #EQU# (3) is used to calculate the theoretical gravity field of a 3-dimensional rectangular/square block at a said grid node of a said mesh.

Optimization of gravity fields of a 3-dimensional density interface is implicitly a mathematical exercise trying to fit the measured gravity fields to the analytical gravity expression invoked in #EQU#3 in least squares approach and identifying the thickness of the 3-dimensional rectangular/square blocks in such a manner that their theoretical gravity responses duplicate the measured ones.

The present invention, which utilizes the principles of optimization, provides a method for determining the lower boundary of a sedimentary basin (or the top of a density interface) at a plurality of grid nodes of a said mesh.

The method of present invention starts by calculating the initial depth estimates of a density interface using the equation, $$z(i,j) = \frac{g_{obs}(i,j) \cdot \Delta\rho_0}{41.89\Delta\rho_0^2 + \alpha g_{obs}(i,j)} \quad (4)$$

Having initializing a density interface, the theoretical gravity fields of 3-dimensional rectangular/square blocks are predicted using #EQU 3#. The predicted and measured gravity fields deviate from each other and the difference between the two could be expressed in a truncated Taylor's series expansion involving the partial derivative of #EQU 3# with respect to the parameter defining the lower boundary of a said 3-dimensional rectangular/square block and the depth increment of a said block, Linear equations similar to #EQU 5# are framed for each grid node of a said mesh and Nx.Ny depth increments are determined by minimizing the misfit function defined by, $$g_{diff}(i,j) = \sum_{j=1}^{Ny}\sum_{i=1}^{Nx} \frac{\partial g}{\partial z} dz(i,j) \quad (5)$$

$$\sum_{j=1}^{Ny}\sum_{i=1}^{Nx} g_{diff}^2(i,j)$$

using the ridge regression algorithm. Here, g2diff(i,j) is the square of the differences between the measured and predicted gravity fields at any grid node (i,j). The necessary system of normal equations is given by, $$\sum_{j=1}^{Ny}\sum_{i=1}^{Nx}\sum_{k=1}^{NP} \frac{\partial g(i,j)}{\partial a_l}\frac{\partial g(i,j)}{\partial a_k}(1+\delta\lambda)a_k = \sum_{j=1}^{Ny}\sum_{i=1}^{Nx} g_{diff}(i,j)\frac{\partial g(i,j)}{\partial a_l},$$

for $l = 1$ to $Nx \cdot Ny$

Here, $$NP = Nx \cdot Ny$$

$$ak = zk, \text{ for } k=1 \text{ to } NP$$

$$dak = dzk, \text{ for } k=1 \text{ to } NP$$

and $$\delta = 1 \text{ for } i = j$$

$$= 0 \text{ for } i \neq j$$

$\lambda$ is the damping factor.

The present invention, describes an automatic formulation for predicting depth values of 3-dimensional basement interfaces from measured gravity fields. A parabolic density-depth function, which models the decrease in density contrast of sedimentary rocks with depth, is used to derive an analytical gravity expression of a 3-dimensional rectangular/square block.

The present invention is an automatic one, in the sense that it does not require any apriori depth values of an interface to be specified as a part of input to the inversion process. At block 3 of FIG. 3, initial depth estimates of a density interface are predicted automatically and stored in a one-dimensional array. The concept of parabolic density-depth function is invoked in initializing a density interface.

Figure 3:
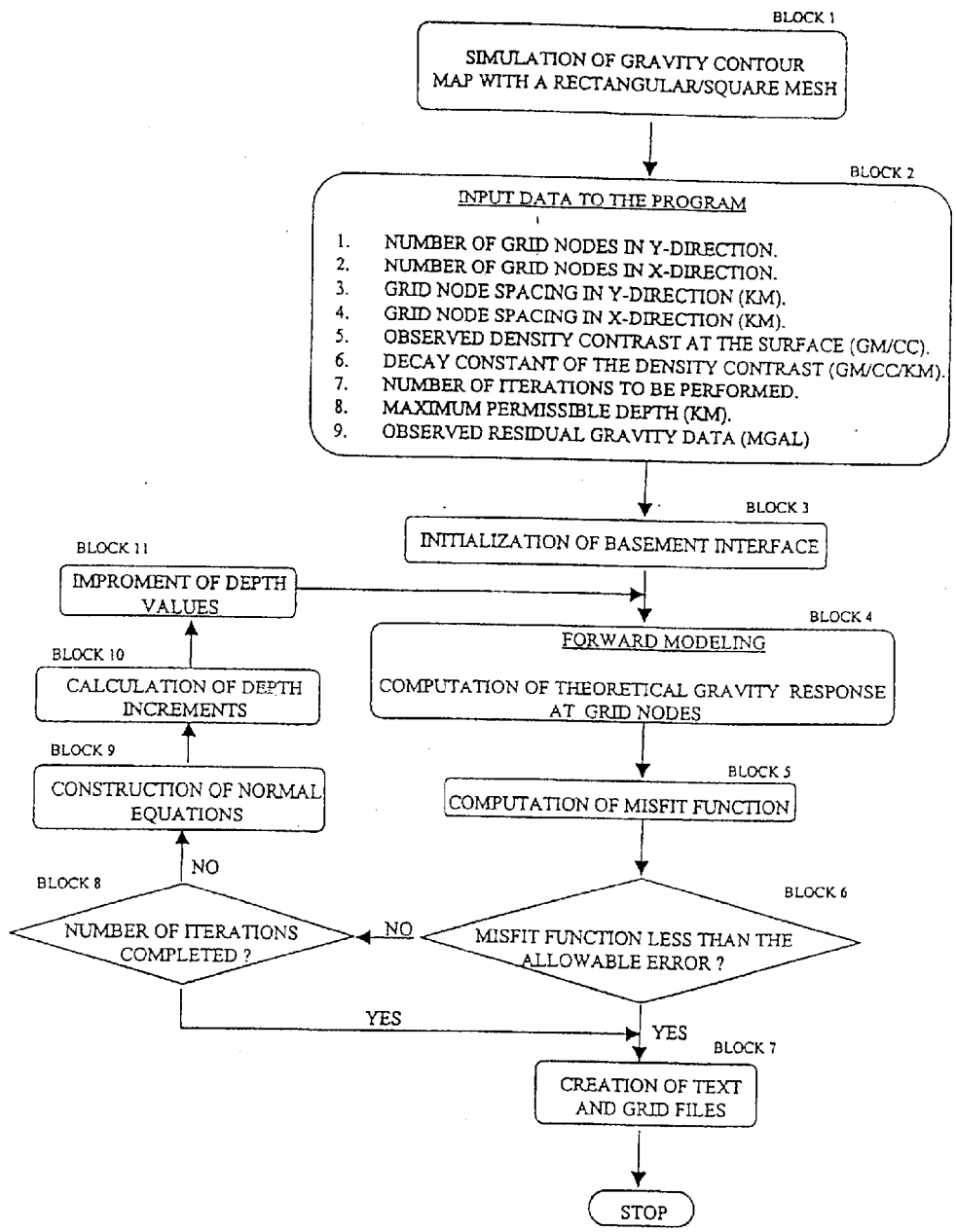
FIG. 3 represents a flow chart of the present invention.

In block 2 of FIG. 3, measured gravity fields are read in to the computer in a two-dimensional array, starting from the first grid node of the lower end of a mesh. The measured gravity fields are then converted in to a one-dimensional matrix array.

Referring to block 4 of FIG. 3, a subroutine said computes the predicted gravity fields of 3-dimensional rectangular/square blocks at all grid nodes of a said mesh. The sub routine sub program automatically takes care of the decrease in density contrast among said 3-dimensional blocks. For all practical purposes, no apparent restriction prevails on the parabolic density-depth function as the density function approximates asymptotic behavior at deeper depths.

In block 9 of FIG. 3, errors between measured and predicted gravity fields and partial derivatives of the parameters, used in the inversion process are stored in a two-dimensional matrix array. The partial derivatives are calculated by the method of numerical differentiation, which automatically eliminates the possibilities of encountering singularities and indeterminacies.

In block 7 of FIG. 3, an inbuilt interface method generates four grid files as a part of out put. Data relating to the measured and predicted gravity fields and depths to the interface form the basic data for creating said grid files. The said grid files can be imported to the GOLDEN SOFTWARE SURFER PACKAGE to view the results in the form of contour maps. All grid files will be generated automatically and no manual intervention is required.

The program is designed to accommodate 525 grid nodes, 25 each along the X and Y directions. In order to accommodate excess grid nodes, the dimension array of the grid nodes has to be increased accordingly.

EXAMPLE

Figure 4:
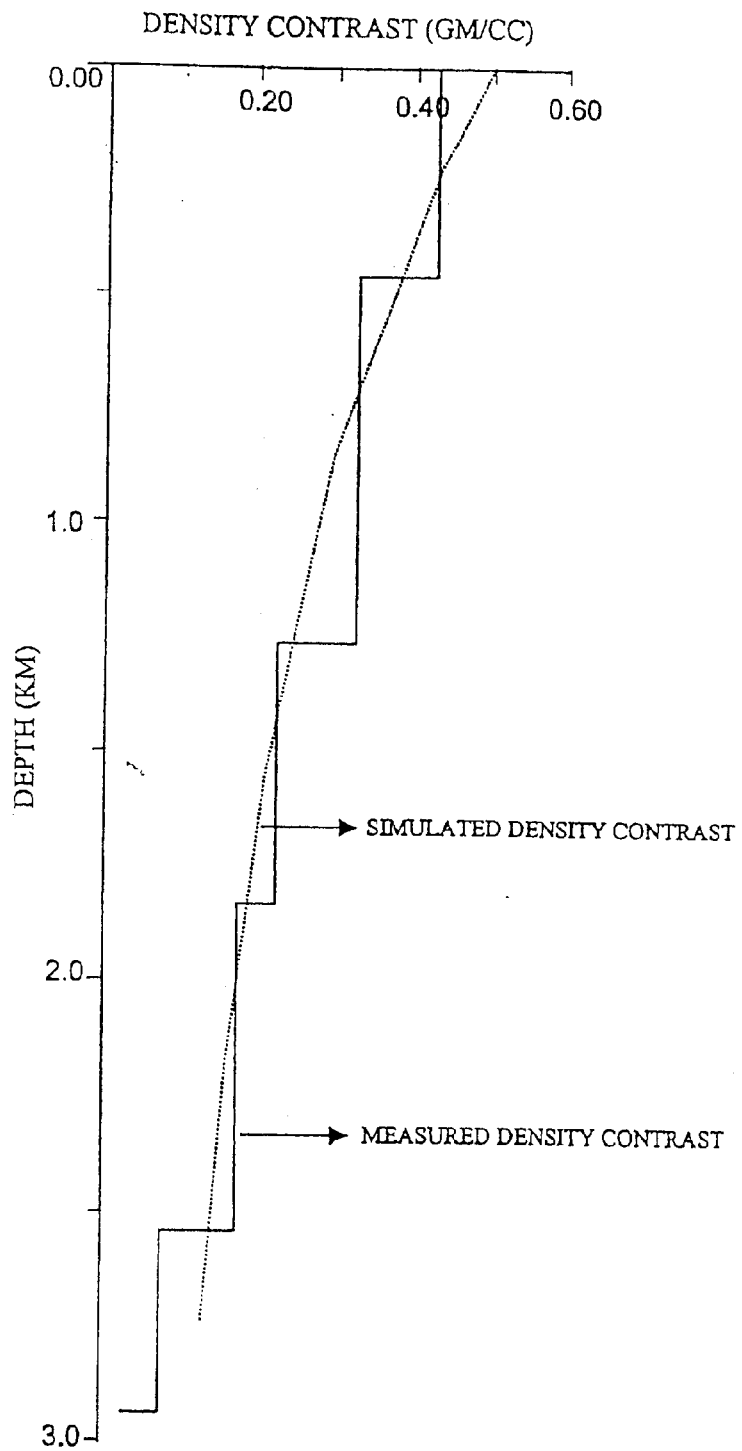
FIG. 4 shows the measured density contrast-depth data of Chintalpudi sub-basin, India. The parabolic density-depth function is also shown in the figure.
Figure 5:
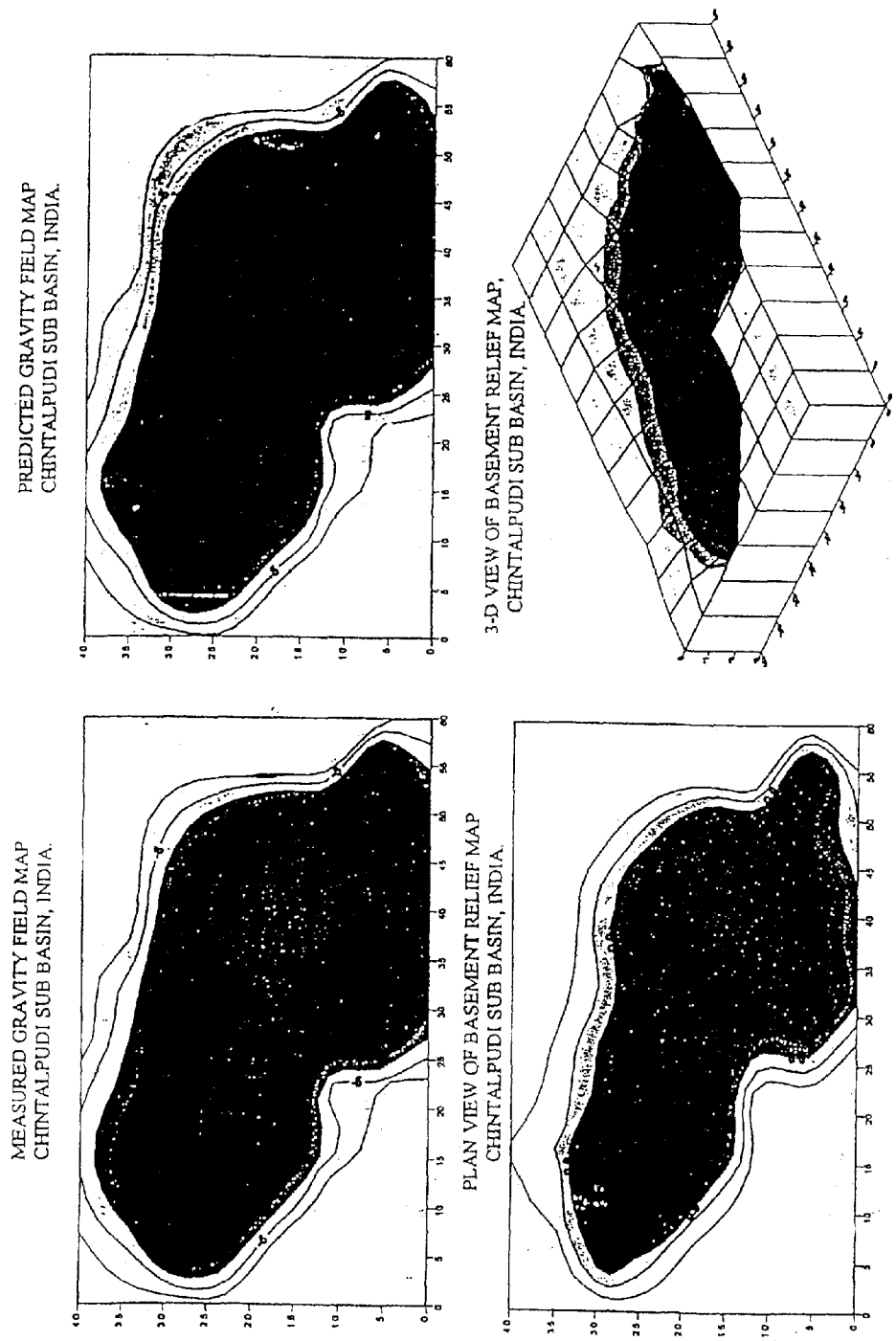
FIG. 5 shows the interpretation of gravity fields over the Chintalpudi sub basin, India. Including in the figure are the measured and predicted gravity fields, plan and 3-d views of the basement relief.

Interpreting two gravity anomaly maps, one over the Chintalpudi sub basin, India, and the other over the Los Angeles basin, California shows the efficacy of the present invention. Solid line in FIG. 4 corresponds to the measured density contrast-depth data from a deep bore hole in the Chintalpudi sub basin, India. A parabolic density-depth function defined with constants $\Delta\rho 0 = 0.5$ gm/cc and $\alpha = 0.1711$ gm/cc/Km explains the decrease in density contrast of sedimentary rocks in the basin (FIG. 4). A rectangular mesh having dimensions 60 Km×40 Km covers the basin proper, completely. A total of 96 gravity field values are digitized at 5 Km grid node spacing. The inversion process has performed 14 iterations before it got terminated. The time taken for 14 iterations on a Sun Spark Server available at National Geographic Research Institute (NGRI), India was 1 hour and 40 minutes. Grid files that are generated at the end of the concluding iteration are imported to the GOLDEN SOFTWARE SURFER PACKAGE and the respective contour maps are shown in FIG. 5. The maximum depth to the interface as measured from the present inversion process is 3.0 Km, which remarkably coincides with the drilling results.

Figure 6:
FIG. 6 shows the interpretation of gravity fields over the Los Angeles basin, California. Contour maps of measured and predicted gravity fields, plan and 3-d views of basement relief are also shown.
Figure 6:
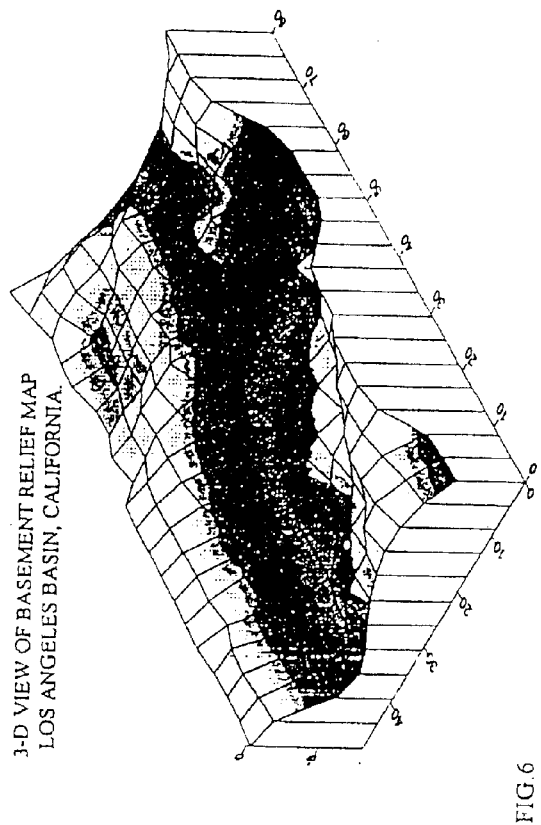
Figure 6:
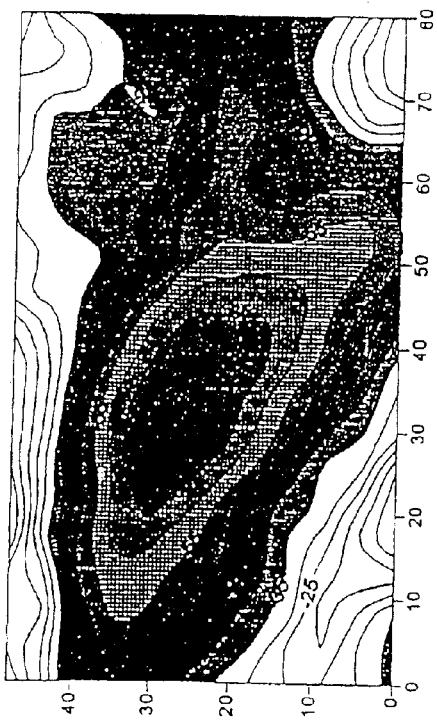
Figure 6:
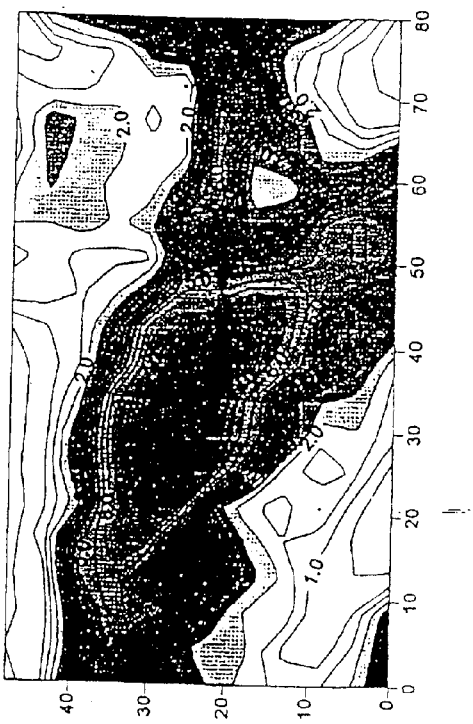

FIG. 6 corresponds to the gravity interpretation of the Los Angeles basin, California. A parabolic density-depth function with constants $\Delta\rho 0 = 0.5206$ gm/cc and $\alpha = 0.0576$ gm/cc/Km explains the density contrast-depth data of the basin (Chakravarthi, 1995). A rectangular mesh having dimensions 80 Km×48 Km is chosen for the present application. A total of 240 grid nodes, at 4 Km grid node interval, are established to digitize the gravity fields (FIG. 6). The inversion process has performed 9 iterations before it got terminated. The time required to perform 10 iterations on a Sun Spark Server was 5 hours. FIG. 6 shows the results of the inversion. The maximum depth to the basement interface as obtained from the present inversion process is 9.0 Km, which agrees well with the reported figure of 9.5 Km.

Residual gravity fields, devoid of regional gravity component, are assumed to be available at regular grid node intervals on a rectangular/square mesh covering a density interface. A stack of 3-dimensional juxtaposed rectangular/square blocks having equal widths and strike lengths approximates the sedimentary sequence above a density interface. Epicenters of the tops of rectangular/square blocks made coincide with the grid nodes of said rectangular/square mesh. Bottoms of rectangular/square blocks are allowed to vary vertically with depth in an iterative approach. Initial depth estimates of a density interface are computed presuming that the existence of infinite slabs among, which the density contrast decreases parabolically with depth, generate the measured gravity fields at said grid nodes. The lower boundary of a sedimentary basin (or the top of a density interface) is formulated by predicting the depth values of said 3-dimensional rectangular/square blocks within the predetermined limits and this could be achieved by minimizing the misfit function, defined by the sum of the squares of the differences between the measured and predicted gravity fields. If the current value of the misfit function is less than its previous value, the depth estimates of a density interface are adjusted to improve the fit between the measured and predicted fields.

ADVANTAGES OF THE INVENTION

1. The proposed invention is simple and effective by having means to execute the method on WINDOWS or UNIX based operating systems.

2. The method requires only the data relating to the number of grid nodes and grid node spacing in X and Y axes of a mesh covering a sedimentary basin, constants of parabolic density function, maximum limiting depth to the density interface and measured gravity fields.

3. The method is an automatic one in the as it it does not require any appriori initial depth estimates of a density interface.

4. The present invention method assumes a continuous decrease in density contrast of sedimentary rocks with depth, a phenomena well observed in many sedimentary all over the world.

5. In the present invention, once the density contrast-depth dependence is simulated by the parabolic density function, the invention could be effectively implemented to interpret the measured gravity fields with equal efficacy.

6. The predictions of the present invention are immensely useful in hydrocarbon exploration.

What is claimed is:

1. A digitally implemented method for determining depth values of a subterranean 3-dimensional density interface based on which a parabolic density-depth function models the decrease in density contrast of sedimentary rocks with depth, said method comprising the steps of:

(a) measuring gravity field values at a plurality of locations over a region covering a sedimentary basin therein said plurality of locations coincides with a plurality of grid nodes of rectangular/square mesh;

(b) approximating the sedimentary sequence above a density interface by an array of 3-dimensional rectangular/square blocks wherein their epicenters coincide with said grid nodes of said mesh;

(c) calculating initial depth estimates of a density interface for said array of 3-dimensional blocks at said plurality of grid nodes;

(d) calculating predicted gravity fields of said 3-dimensional rectangular/square blocks at said plurality of grid nodes of said mesh;

(e) calculating a misfit function between said measured and predicted gravity fields;

(f) improving depth extents of said 3-dimensional rectangular/square mesh at said plurality of grid nodes;

(g) repeating steps (d)–(f), iteratively, until said number of iterations are complete or said misfit function falls below a predefined error; and (h) importing said generated grid files to a software application for viewing said interpreted results in the form of respective contour maps.

2. The method according to claim 1, wherein said rectangular mesh, has dimensions to cover the subterranean surface.

3. The method according to claim 1, wherein the density contrast among said 3-dimensional blocks is assumed to be varying parabolically with depth.

4. The method according to claim 1, wherein the grid node is the intersection point of two profiles constructed along X and Y axes.

5. The method according to claim 1, wherein the density contrast is the difference in densities of a sedimentary sequence and a basement complex.

6. The method according to claim 1, wherein the density interface is the boundary between a sedimentary sequence and a basement complex.

7. The method according to claim 1, wherein the misfit function is defined as the sum of the squares of the differences between measured and predicted gravity fields.

8. The method according to claim 1, wherein the residual gravity field is the gravity contribution generated by a sedimentary sequence alone.

9. The method according to claim 1, wherein the regional gravity field is the gravity contribution generated by deeper sources.

10. The method according to claim 1, wherein the parabolic density-depth function is simulated to ascribe a decrease in density contrast of a sedimentary sequence with depth.

11. The method according to claim 1, wherein the corrections applied to raw gravity data are selected from normal or latitude correction, topographic correction, Bouguer correction free-air correction and isostatic correction.

12. The method according to claim 1, wherein said method reduces Bouguer gravity fields to a horizontal plane.

13. The method according to claim 1, wherein Bouguer gravity field is the gravity contribution generated by shallow, intermediate and deeper sources.

14. The method according to claim 1, wherein said method extracts residual gravity fields from Bouguer gravity fields.

15. The method according to claim 1, wherein the regional gravity field is determined by equating gravity contributions of an out cropping density interface to be equivalent to zero milligals.

16. The method according to claim 1, wherein calculating constants of said parabolic density-depth function by selecting at least one from a known subterranean geological information, subterranean well log data, prestack inversion of seismic data, post stack inversion of seismic data and seismic tomography.

17. The method according to claim 1, wherein initializing the geometry of a density interface is done presuming that the existence of infinite slabs at the grid nodes of the mesh generates the measured gravity fields where the density contrast decreases parabolically with depth.

18. The method according to claim 1, further comprising equating the width and strike length of a said 3-dimensional rectangular/square block to the grid node spacing in X and Y directions of said mesh.

19. The method according to claim 1, further comprising calculating cumulative predicted gravity fields of said 3-dimensional rectangular/square blocks at said grid nodes of said mesh.

20. The method according to claim 1, further comprising deriving an analytical gravity expression of a 3-dimensional rectangular/square block in which a parabolic density-depth function models a decrease in density contrast with depth.

21. The method according to claim 1, further comprising calculating errors and a misfit function between the measured and predicted gravity fields of said 3-dimensional rectangular/square blocks.

22. The method according to claim 1, further comprising calculating numerical derivatives of said 3-dimensional rectangular/square blocks at said grid nodes of said mesh.

23. The method according to claim 1, wherein linear and normal equations are constructed.

24. The method according to claim 1, wherein solving said normal equations for said increments in depth extents of said rectangular/square blocks at said grid nodes.

25. The method according to claim 1, the depths of 3-dimensional rectangular/square blocks are not allowed to extend beyond a permissible depth.

26. The method according to claim 1, wherein by repeating steps (d)–(f), iteratively, the updating of depth extents of 3-dimensional rectangular/square blocks at said grid nodes of said mesh is performed.

27. The method according to claim 1, further comprising performing iteration processes until the misfit function falls below said predefined error or said number of iterations completed.

28. The method according to claim 1, further comprising creating four grid files, one each for the measured gravity, predicted gravity, plan view of basement relief and 3-d view of basement relief models.

29. The method according to claim 1, wherein said method generates said grid files either when the misfit function falls below a predefined allowable error or the specified number of iterations is completed.

30. The method according to claim 1, wherein the maximum depth to the basement interface obtained is about 3–9 km.

31. The method according to claim 1, wherein said digitally implemented method uses means to invert the gravity fields to provide depth values to 3-dimensional density interfaces.

32. The method according to claim 1, wherein said digitally implemented method uses means to input data files.

33. The method according to claim 1, wherein said digitally implemented method invokes the user to specify six file names, two for the input and output files and four for the corresponding grid files.

34. The method according to claim 1, wherein said digitally implemented method has an input data file consisting of five data cards.

35. The method according to claim 1, wherein said digitally implemented method has a first data card consisting of the number of grid nodes in X and Y directions specified by an integer format.

36. The method according to claim 1, wherein said digitally implemented method has a second data card consisting of the grid node interval in X and Y directions specified in real format.

37. The method according to claim 1, wherein said digitally implemented method has a third data card consisting of the observed surface density contrast and constant of the parabolic density-depth function specified in real format.

38. The method according to claim 1, wherein said digitally implemented method has a fourth card with number of iterations to be performed.

39. The method according to claim 1, wherein said digitally implemented method has a fifth data card consisting of the measured residual gravity fields in a real format.

40. The method according to claim 1, wherein said digitally implemented method uses an output file as a means to provide the data relating to measured and predicted gravity fields, and depths to the interface.

41. The method according to claim 1, wherein said digitally implemented method uses means to input parameters and to generate one text file and four grid files as an output.

42. The method according to claim 1, wherein the text file provides ASCII data for the measured and predicted gravity fields and depths to the interface.

43. The method according to claim 1, wherein grid files are automatically generated by said method and having compatibility for importing into A GOLDEN SOFTWARE SURFER PACKAGE to view the results in the form of contour maps.

44. The method according to claim 1, wherein said method assumes a continuous decrease in density contrast of sedimentary rocks with depth.

45. The method according to claim 1, wherein said method is implemented on systems based WINDOWS or UNIX based operating systems.

* * * * *